United States Patent

[11] 3,583,549

| [72] | Inventor | Howard S. Hershey, Jr.<br>Brodbecks, Pa. |
|---|---|---|
| [21] | Appl. No. | 828,325 |
| [22] | Filed | May 27, 1969 |
| [45] | Patented | June 8, 1971 |
| [73] | Assignee | Teledyne, Inc.<br>York, Pa. |

[54] VARIABLE COOLING TIME RACK-TYPE COOLER
7 Claims, 11 Drawing Figs.

| [52] | U.S. Cl. | 198/138 |
|---|---|---|
| [51] | Int. Cl. | B65g 17/00 |
| [50] | Field of Search | 198/85, 137, 138 |

[56] References Cited
UNITED STATES PATENTS

| 3,240,316 | 3/1966 | Huffman et al. | 198/85 |
|---|---|---|---|
| 3,349,928 | 10/1967 | Howard | 198/85 |

*Primary Examiner*—Andres H. Nielsen
*Attorney*—Otto Moeller

ABSTRACT: An article treating apparatus for use, for example, in cooling hot depanned loaves of bread wherein rows of hot loaves are supported on successive shelves movable by conducting means in a closed loop through a cooling zone from a loading station to an unloading station. Means is provided for operating the conducting means at different preselected desired speeds to proportionally change the residence time of the bread loaves in the cooling zone as the shelves travel from the loading station to the unloading station, whereby the loaves are subjected to a desired degree of cooling. Transversely extending endless infeed and discharge conveyors are operated intermittently and at a constant speed to introduce into the loading station from one side successive rows of hot loaves into position for leading onto successive shelves and to discharge from the unloading station from the same side successive rows of cooled loaves unloaded from successive shelves onto the discharge conveyor. Control means operated in timed relation with the shelf conducting means automatically controls the run time of the infeed and discharge conveyors proportionally to the residence time of the bread loaves in the cooling zone to introduce into and discharge from the loading and unloading stations proportionally varying lengths of rows of bread loaves.

INVENTOR.
HOWARD S. HERSHEY JR.
BY Otto Moeller

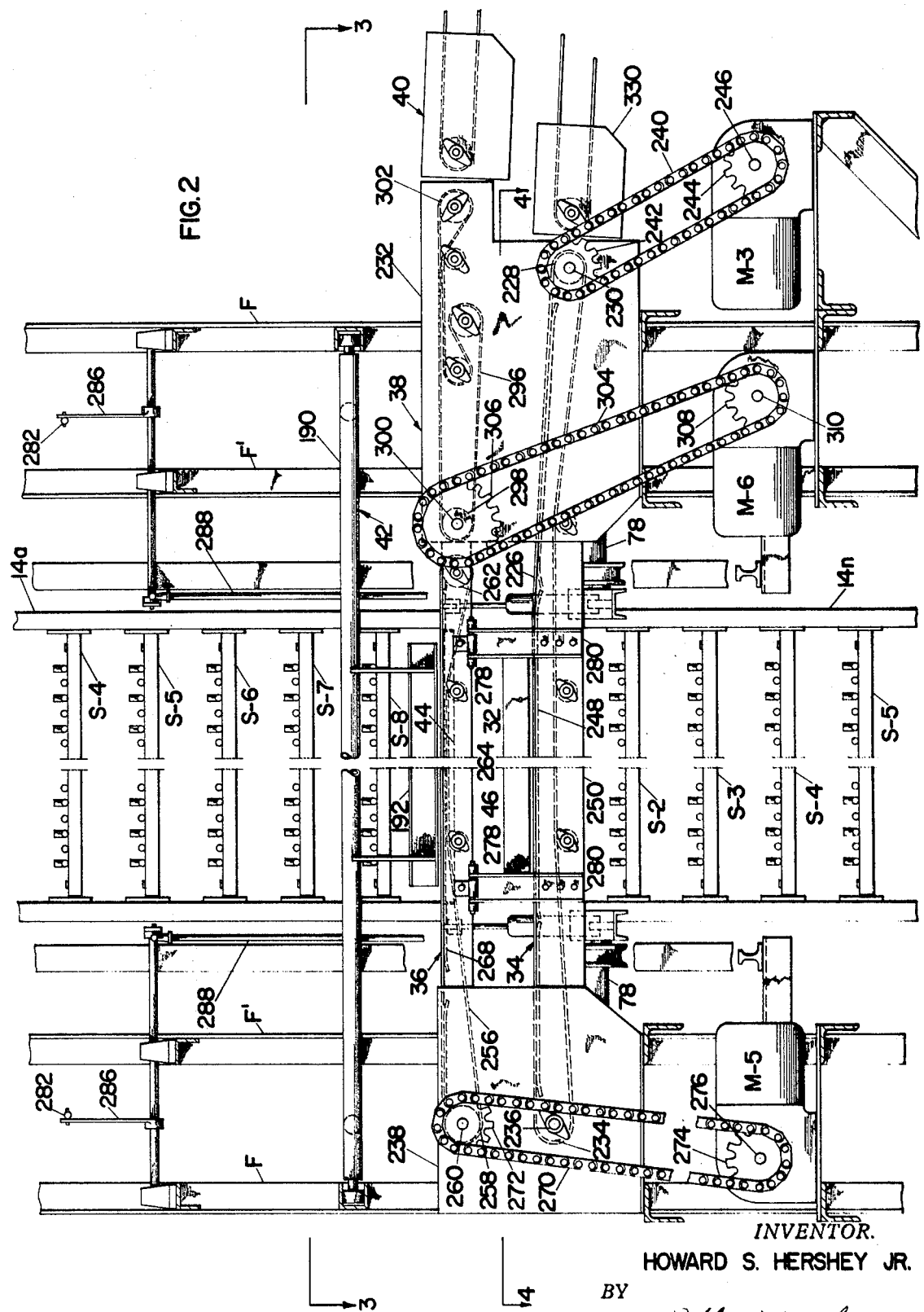

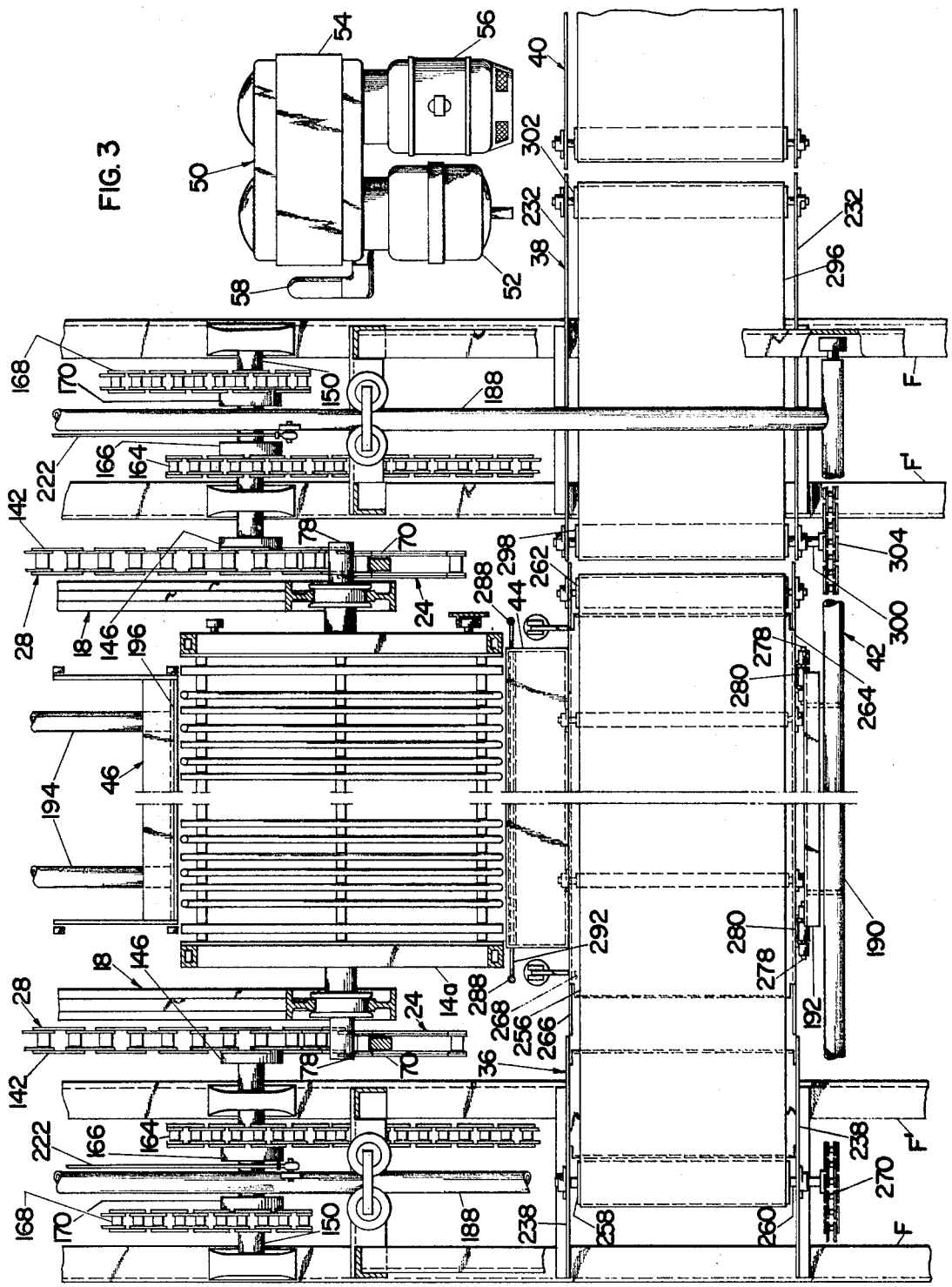

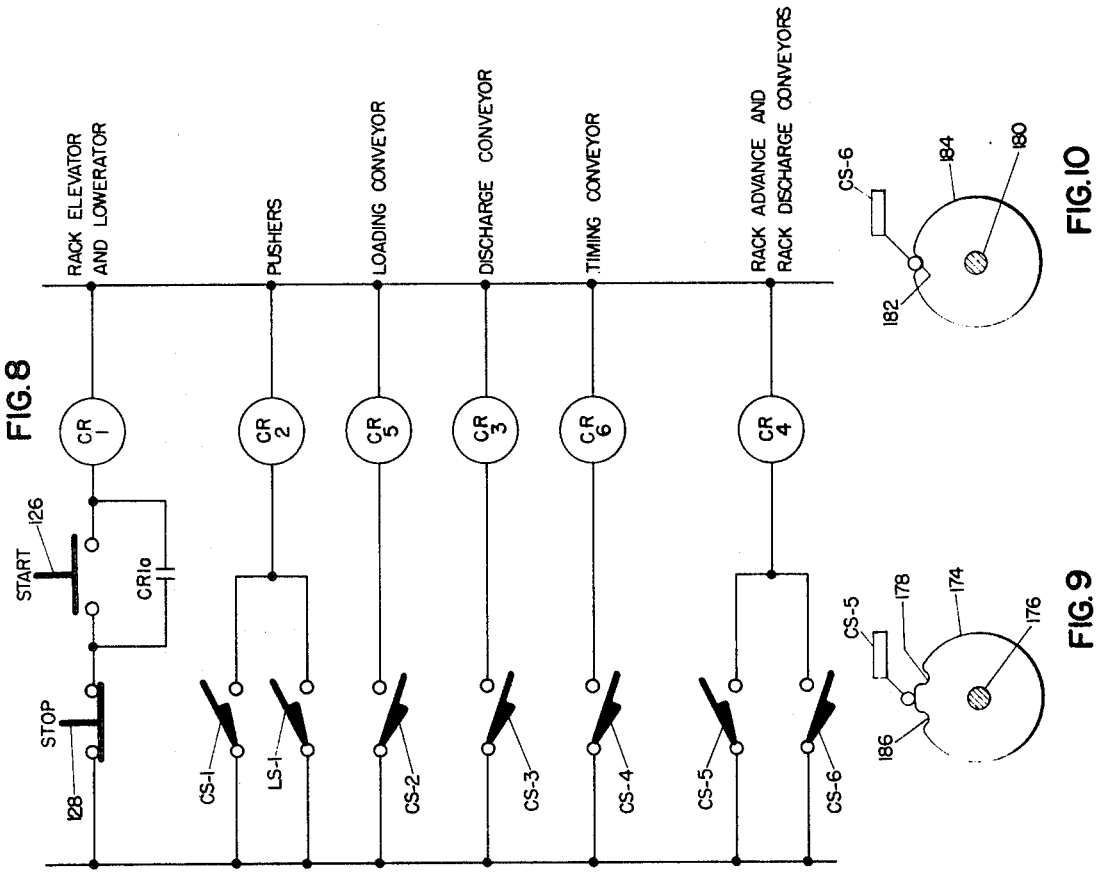

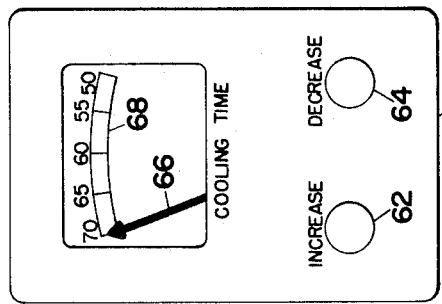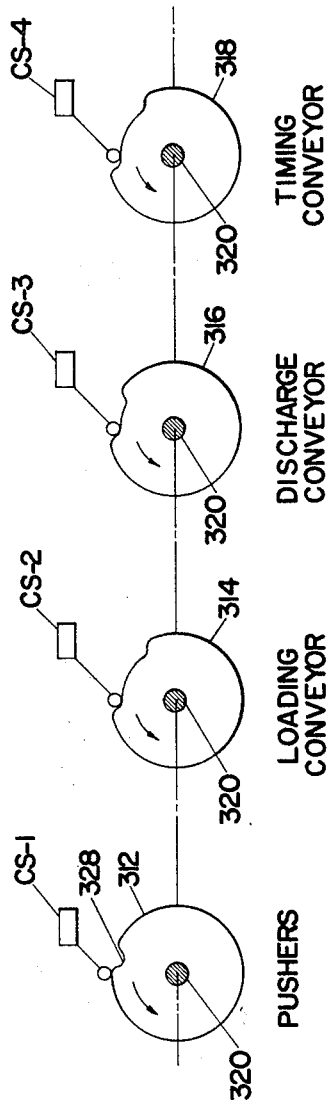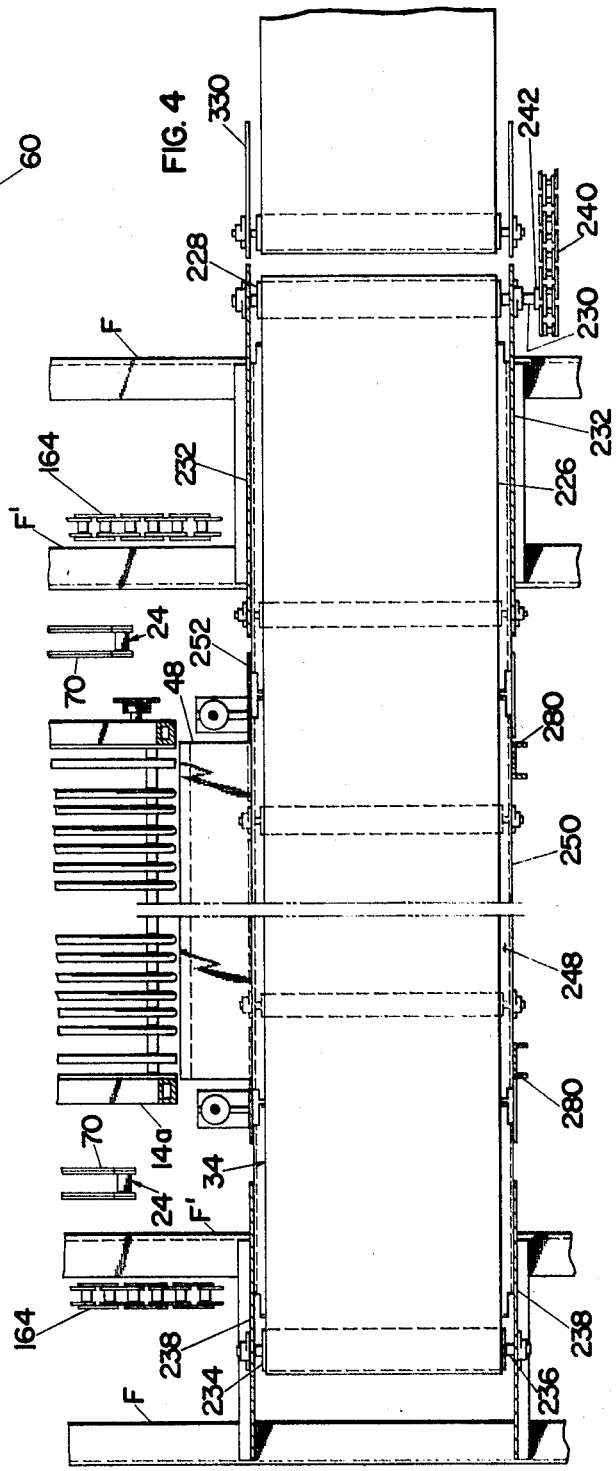

VARIABLE COOLING TIME RACK-TYPE COOLER

BACKGROUND OF THE INVENTION

This invention relates to article treating apparatus, and more particularly to a bread cooler for use in large commercial bakeries wherein each piece of apparatus employed in the production line must have a capacity and be capable of carrying out its function so as to conform with the operation of the other apparatus in the line to maintain a continuous production flow. In particular, the invention relates to bread coolers of the type wherein a plurality of shelves are conducted in a closed loop through a cooling zone in equidistant spaced relation past a loading station and an unloading station and wherein endless transversely extending intermittently operated infeed and discharge conveyors respectively introduce into the loading station successive rows of hot loaves into position to be loaded onto successive shelves and discharge from the unloading station successive rows of cooled loaves unloaded from successive shelves. The ambient temperature, the nature of the product, the temperature of the baked product on entering the cooling zone or other conditions make it necessary, in order to obtain a desired temperature of the product on its discharge from the cooling zone, to control the residence time of the product in the cooling zone or in other words to control the cooling time. The size of a cooler in respect of the number and width of the shelves is established by the baker's maximum production rate and the maximum desired cooling time for this production rate. In the past, a limited range of cooling time was provided for by operating the various components of the cooler including the shelf conducting means and the infeed and discharge conveyors at faster speeds. However, in such coolers, particularly coolers of large capacity, the speeds of the infeed and discharge conveyors become excessive as the residence time of the product in the cooling zone, or the cooling time, is substantially reduced. The hot bread loaves entering the cooler are very soft and fragile and because of the inertia of the loaves when the intermittently operated infeed conveyor starts and stops at excessive speeds, they are frequently tumbled over and jarred, destroying the shape of the loaves or otherwise injuring them and rendering them unsalable. Also excessive speeds of the intermittently operated infeed and discharge conveyors upon starting and stopping cause the loaves to become disoriented or tumbled over, so that when they are loaded onto the cooler shelves or unloaded from the cooler shelves by the pushers, they violently collide causing them to become bruised and damaged. The apparatus of the present invention renders these shortcomings and disadvantages of prior art coolers negligible.

SUMMARY OF THE INVENTION

In coolers of the above type, sized in respect of the number and width of the shelves to handle the baker's maximum production rate at a desired maximum cooling time, the invention provides change speed means arranged to change the speed of the shelf conducting means and the intermittently operated shelf loading and unloading means concurrently and by the same proportional amounts to selectively vary the residence time of the hot bread loaves in the cooler cooling zone, or in other words to vary the cooling time. The infeed and discharge conveyors are operated intermittently in timed relation with respect to the shelf conducting means and at a constant speed for introducing into the loading station from one side of the cooler successive rows of hot loaves into position for loading onto successive shelves and for discharging from the unloading station from the same side of the cooler successive rows of cooled loaves unloaded from successive shelves onto the discharge conveyor. The invention provides means operated in timed relation with the shelf conducting means for automatically controlling the distance that the infeed and discharge conveyors run in proportion to the selected residence time of the loaves in the cooling zone, or in other words the selected cooling time for the loaves.

Assume, for example, at the baker's maximum production rate and maximum desired cooling time of 70 minutes, 14 foot rows of loaves are introduced into and discharged from the loading and unloading stations by the infeed and discharge conveyors. Now, if for example at the same production rate a 50 minute cooling time is required, the shelf conducting means is speeded up to provide a 50 minute residence time of the loaves in the cooler; and since the infeed and discharge conveyors are operated intermittently in timed relation with the shelf conducting means, they will operate at more frequent intervals but at the same speed as before and automatically operate through only 50/70 of the distance as before to introduce and discharge only 10 foot rows of loaves. For a 55 minute cooling time, the infeed and discharge conveyors will operate through 55/70 of the distance and the loaves will be loaded on 55/70 of the shelf width.

It is consequently an object of the invention to provide a more flexible cooler providing for handling a baker's maximum product production rate throughout a wide range of cooling times, while operating the product infeed and discharge conveyors at a constant rate of speed, and whereby at the faster cooling times the intermittently operated infeed and discharge conveyors are adapted to handle the baker's maximum production rate without increasing their speed of operation to thereby minimize or eliminate disorientation or damage to the bread loaves.

A further object is the provision of means for automatically controlling the run time of the product infeed and discharge conveyors to introduce into and discharge from the cooler rows of product varying in length proportionally to a selected cooling time for the product as determined by the speed of the means conducting the product through the cooling zone from the loading to the unloading station.

Other objects and advantages of the invention will be hereinafter pointed out or will become apparent from the following description when read in conjunction with the accompanying drawings.

BRIEF DESCRIPTION OF THE DRAWINGS

FIG. 2 is an enlarged sectional view taken on the line 2-2 of FIG. 1;

FIG. 3 is a sectional view taken on the line 3-3 of FIG. 2;

FIG. 4 is a sectional view taken on the line 4-4 of FIG. 2;

FIG. 5 is a diagrammatic view of the electrical circuit from a constant frequency power source to the motors of the product infeed and discharge conveyors;

FIG. 6 is a diagrammatic view of the electrical circuit from a variable frequency power source to the motors of the shelf conducting means and the loading and unloading pushers;

FIG. 7 is a diagrammatic view of the control panel for selectively changing the residence time of the product in the cooling zone;

FIG. 8 is a wiring diagram illustrating the control system for the motors of FIGS. 5 and 6;

FIGS. 9 and 10 are schematic views showing the arrangement of controlling cams for elements of the shelf conducting means; and FIG. 11 is a schematic view showing the arrangement of controlling cams for the pushers and infeed and discharge conveyors.

DESCRIPTION OF THE PREFERRED EMBODIMENT

Figure 1:
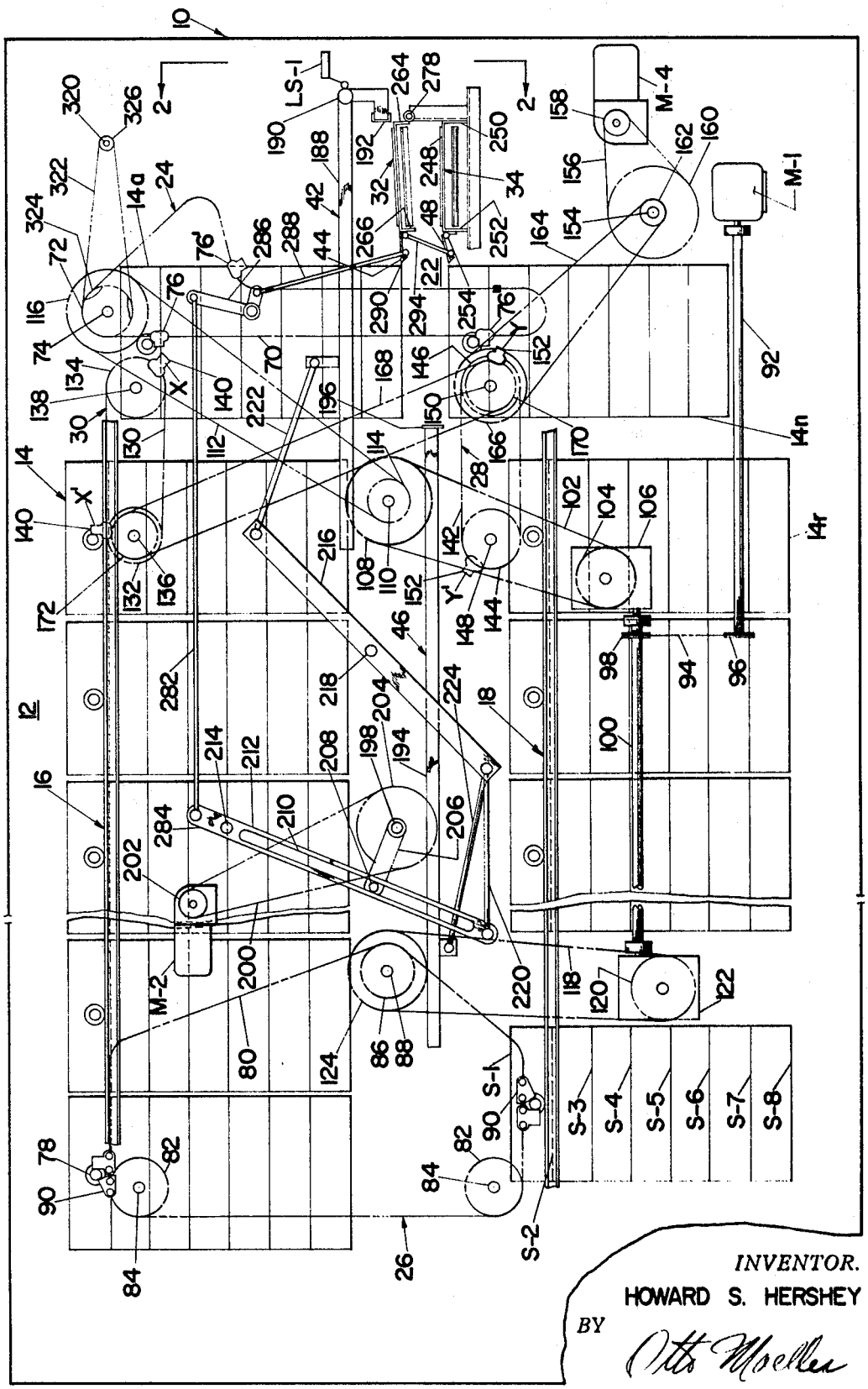
FIG. 1 is a view in side elevation taken inside the cooler housing with the various elements contained therein shown more or less diagrammatically.

The invention is shown and described as applied to a rack-type bread cooler which, for purpose of illustration, may be generally similar to the construction of the dough proofer shown in Howard U.S. Pat. No. 3,349,928, granted Oct. 31, 1967. Referring particularly to FIG. 1, the cooler comprises a generally rectangular elongated housing 10 defining a cooling chamber 12 through which racks 14, carrying hot baked products such as bread loaves, travel in an elongated closed loop having an upper horizontal longitudinally extending run 16 and a lower horizontal longitudinally extending run 18.

The housing 10 is preferably in the form of a skeleton framework made up of vertical and horizontal interconnected angle irons or other suitable structural elements enclosed elements enclosed by sheet metal panels, not shown, or other suitable enclosing means. The skeleton framework includes at each side of the housing 10, outer and inner spaced frames F and F', as best shown in FIGS. 2 and 3. Suitable forced air cooling means, not shown, is provided for cooling the hot baked products during their transit through the cooling chamber 12.

The racks 14 are in the form of an open rectangular framework having a plurality of equidistantly vertically spaced shelves, eight such shelves designated S-1 through S-8 being shown in the present instance. The racks 14 may be of any suitable construction well known in the art as shown and described, for example, in the above referred to Howard patent.

The forward end of the cooling chamber 12 is arranged to provide a loading and unloading station 22, at which station successive transverse rows of hot bread loaves are loaded onto successive shelves of the racks 14 and successive transverse rows of cooled bread loaves are unloaded from successive rack shelves.

A continuously operating rack elevator, indicated generally by reference numeral 24, raises successive racks 14 through the loading and unloading station 22. A continuously operating rack lowering means, indicated generally by reference numeral 26, lowers successive racks from upper horizontal run 16 to lower horizontal run 18. The rack elevator and lowering means are operated by a gear head reduction motor M-1.

An intermittently operating rack advance conveyor 28 at the forward end of lower run 18 advances successive terminal racks 14 on lower run 18 to a position beneath a preceding rack 14 that is being elevated, and in position to be picked up by the rack elevator 24. An intermittently operating rack discharge conveyor 30 at the forward end of upper run 16 picks up a rack 14 that has been elevated by the rack elevator 24, and discharges it along upper run 16 a distance and at a rate of speed to provide clearance for the succeeding rack that is being elevated. The rack advance and rack discharge conveyors are operated by a gear head reduction motor M-4.

Projecting through one side of the cooler housing 10 and extending into the loading and unloading station 22 a spaced distance forward of the path of a rack that is being elevated, are transversely extending vertically spaced upper and lower conveyors 32 and 34.

The upper conveyor 32, hereinafter referred to as the infeed conveyor is, for reasons later to be explained, composed of a pair of end to end related endless conveyor sections 36 and 38, preferably of conventional belt type construction. The laterally inner and outer conveyor sections 36 and 38 are hereinafter respectively referred to as the loading conveyor and the timing conveyor.

Hot bread loaves from an oven (not shown), after being depanned are conveyed single file by conventional conveying means, fragmentarily shown in FIGS. 2 and 3 at 40, to the timing conveyor 38. The timing conveyor 38 is intermittently operated by a reduction gear head motor M-6 to deliver bread loaves in successive groups to the loading conveyor 36.

The loading conveyor 36 is intermittently operated by a gear head reduction motor M-5 and conveys successive groups of bread loaves received from the timing conveyor 38 to a position in the cooler housing 10 in front of a rack being elevated by the rack elevator 24. The lower conveyor 34, hereinafter referred to as the discharge conveyor, preferably of conventional belt-type construction, is intermittently operated by a gear head reduction motor M-3 and discharges successive groups of cooled bread loaves from the cooler.

A reciprocatably moving pusher, hereinafter referred to as the loading pusher 42, pushes successive groups of bread loaves from the loading conveyor 36 across a transfer plate 44 onto successive shelves of a rack 14, as the rack is continuously elevated through the loading and unloading station 22.

A reciprocatably moving pusher, hereinafter referred to as the unloading pusher 46, pushes successive groups of cooled bread loaves from successive rack shelves across a transfer plate 48 onto the discharge conveyor 34.

The loading pusher 42 and the unloading pusher 46 are simultaneously but intermittently operated by a gear head reduction motor M-2.

For reasons which will become apparent, the loading conveyor motor M-5, the discharge conveyor motor M-3 and the timing conveyor motor M-6, referring to FIG. 5, are disposed in a circuit leading from a constant frequency power source; while the rack elevator and lowering motor M-1, the loading and unloading pusher motor M-2, and the rack advance and discharge motor M-4, referring to FIG. 6, are disposed in a circuit leading from a variable frequency power source. The speeds of the loading conveyor 36, the timing conveyor 38 and the discharge conveyor 34 are therefore constant, although their relative speeds are preferably different as will be hereinafter described. The variable frequency power source is adapted for selectively changing the frequency of the current concurrently to the motors M-1, M-2 and M-4 for changing the speed of these motors by the same proportional amounts to thereby change the speed of the rack elevator and lowering means, the loading and unloading pushers and the rack advance and rack discharge conveyors together and by the same proportional amounts. In this manner the retention time of the products in the cooler, or what is hereinafter referred to as the cooling time, is selectively variable at the will of the operator.

The variable frequency power source may be of any suitable type well known in the art as, for example, the "Varidyne" system manufactured by U. S. Electrical Motors, Division of Emerson Electric, Saint Louis, Mo., and is therefore not described in detail. In FIG. 3, the "Varidyne" system is shown as including a power unit 50 that may be disposed at any convenient location outside the cooler housing 10. The power unit 50 includes a "Varidrive" consisting of a constant speed induction motor 52 and built in variable-sheave speed changing transmission 54 for driving the "Varidyne" alternator 56 at variable speed in order to produce variable frequency current. Speed variation is achieved by changing the alternator speed in any well known manner, by a handwheel, or remote electric or pneumatic controls. In the present instance a control motor 58 is shown for changing the sheave ratio of the variable-sheave speed changing transmission 54 whereby the alternator 56 is operated at different desired speeds. The motor 58 is controlled from a suitably remotely mounted pushbutton panel 60, FIG. 7, provided with an increase pushbutton 62 which when depressed by the operator closes a circuit to the control motor 58 for operating it in a direction to slow down the speed of the alternator 56 thereby proportionately speeding up motor M-1, M-2 and M-4 and decreasing the residence time of the products in the cooler, or in other words decreasing the cooling time.

Mounted on panel 60 is a needle indicator 66 arranged to record change in voltage in the circuit to the motors M-1, M-2 and M-4, which varies directly proportionately to the frequency of the current to the motors. The indicator 66 is arranged to move over a scale 68 which is calibrated to indicate different cooling times, in the present instance 70, 65, 60, 55 and 50 minute cooling times. Thus if the motors M-1, M-2 and M-4 are operating at a speed to provide a 70 minute cooling time, the operator by depressing the decrease pushbutton 64, thereby speeding up the alternator 56 and increasing the voltage to the motors M-1, M-2 and M-4, can thereby reduce the cooling time to any desired time, or conversely by depressing the increase button 62 the cooling time can be increased from a short to a longer cooling time.

The rack elevator 24 is in all essential respects the same as that shown and described in the above referred to Howard U.S. Pat. No. 3,349,928, and includes a pair of endless chains 70 disposed in parallel laterally spaced planes sufficiently far apart to receive a rack 14 therebetween. At their upper ends the chains are trained around sprockets 72 fixed on the inner ends of transversely extending stub shafts 74 rotatably mounted in suitable bearings carried by outer and inner frames F and F' of the opposite sides of housing 10.

The lengths of the chains 70 are such as to carry three equidistantly spaced lugs 76, 76' and 76'', with the distance between the lugs being equal to the distance between the top shelf and the bottom shelf of a rack plus one additional rack shelf space. The lugs 76, 76' and 76'' in their travel along the ascending run of the chains 70 engage the rack stub shafts 78 to elevate successive racks 14 advanced by the rack advance conveyor 28. Successive racks are raised in this manner through the loading and unloading station 22 with the bottom shelf of one rack and the top shelf of a succeeding rack spaced a shelf space apart so that not only may two successive shelves of a rack be simultaneously loaded and unloaded, but also the bottom shelf of one rack and the top shelf of a succeeding rack.

The rack lowering means 26 is in all essential respects the same as that shown in the above referred to Howard U.S. Pat. No. 3,249,928, and includes a pair of endless chains 80 disposed in parallel laterally spaced planes sufficiently far apart to receive a rack 14 therebetween. The chains 80 are trained around driven sprockets 82 fixed on the inner ends of transversely extending stub shafts 84 rotatably mounted in suitable bearings carried by outer and inner frames F and F' of the opposite sides of housing 10, and around drive sprockets 86 fixed on a transversely extending through shaft 88 rotatably mounted in suitable bearings carried by the frame members F and F' of the opposite sides of housing 10. Latch and lug means 90 carried by the chains 80 are arranged to engage the rack stub shafts 78 for moving successive racks 14 from upper horizontal run 16 to lower horizontal run 18.

The rack elevator 24 and the lowering means 26 are continuously driven in synchronized timed relation from the previously referred to motor M-1, mounted in the lower forward left side of the cooler housing 10. The drive means includes a longitudinally extending torque tube 92 operated by motor M-1 and disposed between outer and inner frames F and F' at the left side of the cooler. A chain 94 is trained around sprockets 96 and 98 fixed, respectively, on the rearward end of torque tube 92 and intermediate the ends of a vertically offset longitudinally extending torque tube 100. A chain 102 is trained at its lower end over a sprocket 104 fixed on the output shaft of a speed reducer 106 connected with the forward end of torque tube 100, and at its upper end over a sprocket 108 fixed on one end of a transversely extending through shaft 110. A pair of chains 112 at opposite sides of the cooler are trained over sprockets 114 fixed on opposite ends of through shaft 110 and over sprockets 116 fixed on the previously referred to stub shafts 74 of the rack elevator 24 for operating the same. A chain 118 is trained at its lower end over a sprocket 120 fixed on the output shaft of a speed reducer 122 connected with the rearward end of torque tube 100, and at its upper end over a sprocket 124 fixed on one end of through shaft 88 of the rack lowering means 26 for operating the same.

Referring to FIG. 8 schematically showing a wiring diagram of the control system for the motors M-1, M-2, M-3, M-4, M-5 and M-6, operation of the rack elevator 24 and lowering means 26 is initiated by depressing normally open start switch 126 thereby completing a circuit to and energizing control relay CR1. Energization of control relay CR1 closes its normally open contact CR1a to retain control relay CR1 energized when start switch 126 is released. Energization of control relay CR1 also closes normally open contacts CR1b in the variable frequency circuit to motor M-1, FIG. 6, so that the rack elevator 24 and lowering means 26 are continuously operated until such time as normally closed stop switch 128 is depressed to break the circuit to and deenergize control relay CR1.

The previously referred to rack discharge conveyor is in all essential respects the same as that shown and described in the above referred to Howard U.S. Pat. No. 3,349,928, and includes a pair of intermittently operated endless chains 130 disposed in opposite sides of the cooler housing 10 trained around rearward drive sprockets 132 and forward driven sprockets 134 mounted on stub shafts 136 and 138, respectively. The stub shafts 136 and 138 are suitably journaled in bearings carried by the outer and inner frames F and F' of the housing framework. The rack discharge conveyor chains 130 carry lugs 140 arranged to engage the stub shafts 78 of a rack elevated by the rack elevator 24 and move it rearwardly along upper run 16 to thereby push all the racks on upper run 16 rearwardly.

The previously referred to rack advance conveyor 28 is in all essential respects the same as that shown and described in the above referred to Howard U.S. Pat. No. 3,349,928, and includes a pair of intermittently operated endless chains 142 disposed in opposite sides of the cooler housing 10 trained around rearward driven sprockets 144 and forward drive sprockets 146 mounted on stub shafts 148 and 150, respectively. The stub shafts 148 and 150 are suitably journaled in bearings carried by the outer and inner frames F and F' of the housing framework. The rack advance conveyor chains 142 carry lugs 152 arranged to engage the stub shafts 78 of a rack to move it forwardly along lower run 18 into position to be picked up by the rack elevator 24.

The rack discharge conveyor 30 and the rack advance conveyor 28 are operated by the previously referred to motor M-4. The motor M-4 is conveniently mounted in one side of the housing 10 between outer and inner frames F and F'. A transversely extending through shaft 154 journaled at its ends in suitable bearings carried by the inner frames F' of the opposite sides of the cooler housing, is driven by a chain 156 trained over sprockets 158 and 160 fixed, respectively, on the output shaft of motor M-4 and one end of through shaft 154. Secured on opposite ends of through shaft 154 between outer and inner frames F and F' are sprockets 162. Chains 164 are trained over the sprockets 162 and over sprockets 166 fixed on the stub shafts 150 of the rack advance conveyor 28 for operating the same. Chains 168 are trained over sprockets 170 on the stub shafts 150 of the rack advance conveyor 28 and over sprockets 172 fixed on the stub shafts 136 of the rack discharge conveyor 30 for operating the same.

Suitable timing means operated in timed relation with rack elevator 24 is employed for controlling intermittent operation of motor M-4 to operate the rack advance conveyor 28 and the rack discharge conveyor 30 at the proper time for advancing a rack into position to be picked up by the rack elevator 24 and discharging a rack that has been elevated through the loading and unloading station 22.

For this purpose, referring particularly to FIGS. 6, 8, 9 and 10, a cam disc 174 is mounted on a shaft 176 operated in timed relation with the rack elevator 24 to rotate the cam disc 174 through one revolution for each travel of the rack elevator 24 through a distance equal to the distance between two successive rack engaging lugs of the rack elevator, for example, the distance between lugs 76 and 76'', which distance as previously pointed out equals the distance between the top shelf and the bottom shelf of a rack plus one additional shelf space.

Cam disc 174 is provided with a notch 178 disposed therein to be engaged by cam switch CS-5 when rack 14a has been elevated sufficiently from the position shown in FIG. 1 for engagement of rack discharge conveyor lugs 140 with rack stub shafts 78 to discharge the rack 14a. Engagement of cam switch CS-5 in the notch 178 completes a circuit to and energizes control relay CR4. Energization of control relay CR4 closes normally open contacts CR4a in the circuit to and initiates operation of motor M-4. Operated in timed relation with motor M-4 is a shaft 180, FIG. 10, arranged to make one revolution while the lugs 140 of the rack discharge conveyor 30 move on a rack discharging run from position X to X' and the lugs 152 of rack advance conveyor move on a dry or empty run from position Y to Y'.

When motor M-4 starts, cam switch CS-6 rides out of a notch 182 of a cam disc 184 fixed on shaft 180 to complete a holding circuit to control relay CR4 when cam switch CS-5 rides out of notch 178, to thereby maintain motor M-4 energized. When cam disc 184 completes one revolution, cam switch CS-6 will again engage notch 182 of cam disc 184 to deenergize control relay CR4 and stop motor M-4.

Now, when rack 14n has been elevated from the position shown in FIG. 1 to a position where its lowermost shelf S-8 clears the product on the top shelf of rack 14r, cam switch CS-5 engages a notch 186 of cam disc 174 to again complete the circuit to and energize control relay CR4. Energization of control relay CR4 again closes contacts CR4a in the circuit to and again initiates operation of motor M-4. When motor M-4 starts, cam switch CS-6 again rides out of notch 182 of cam disc 184 to again complete a holding circuit to control relay CR4 when cam switch CS-5 rides out of notch 178 to thereby maintain motor M-4 energized, whereupon rack advancing conveyor 28 and rack discharge conveyor 30 are operated to move lugs 152 on a rack advancing run from position Y' to Y and the lugs 140 on a dry or empty run from position X' to X.

The previously referred to loading pusher 42 is in all essential respects the same as that shown and described in the above referred to Howard U.S. Pat. No. 3,349,928, and includes a pair of longitudinally extending rods 188 at opposite sides of the path of the racks, connected at their forward ends by a transversely extending rod 190 from which is pendently supported a pusher bar 192. The loading pusher 42 is mounted in the cooler housing for reciprocating fore and aft movement so that the pusher bar 192 is adapted to sweep across the loading conveyor 36 and transfer plate 44 for pushing successive rows of bread loaves from the loading conveyor 36 onto successive rack shelves as the racks are continuously elevated through the loading and unloading station 22.

The previously referred to unloading pusher 46 is in all essential respects the same as that shown and described in the above referred to Howard U.S. Pat. No. 3,349,928, and includes a pair of longitudinally extending transversely spaced rods 194 connected at their forward ends by a transversely extending pusher bar 196. The unloading pusher 46 is mounted in the cooler housing in the space between the racks on upper and lower runs 16 and 18 for reciprocating fore and aft movement so that pusher bar 196 is adapted to sweep successive rows of bread loaves from successive rack shelves across transfer plate 48 onto the discharge conveyor 34 as the rack are continuously elevated through the loading and unloading station 22.

The loading and unloading pushers 42 and 46 are operated through linkage means by the previously referred to motor M-2 for simultaneously loading and unloading two successive rack shelves. Motor M-2 is conveniently mounted in one side of the housing 10 between outer and inner frames F and F'. A transversely extending through shaft 198 journaled at its ends in suitable bearings carried by inner frames F' is driven by chain 200 trained over sprockets 202 and 204 fixed, respectively, on the output shaft of motor M-2 and on one end of through shaft 198. Fixed on opposite ends of through shaft 198 are radially extending crank arms 206, the free ends of which carry cam followers 208 engaging cam grooves 210 in pusher operating arms 212. The pusher operating arms 212 are pivotally mounted at their upper ends on transverse stub shafts 214 journaled in suitable bearings carried by outer and inner frames F and F' at opposite sides of the housing 10. A second pair of pusher operating arms 216 are secured intermediate their ends on stub shafts 218 journaled in suitable bearings carried by outer and inner frames F and F' at opposite sides of A second pair of pusher operating arms 216 are secured intermediate their ends on stub shafts 218 journaled in suitable bearings carried by outer and inner frames F and f' at rods 220 pivotally connect the opposite sides of the housing 10. Tie rods ends of pusher operating arms 212 and 216, tie rods 222 pivotally connect the upper ends of pusher operating arms 216 with the rods 188 of the loading pusher 42, and tie rods 224 pivotally connect the lower ends of pusher operating arms 216 with the rods 194 of the unloading pusher 46.

Timing means, hereinafter to be described, is employed for controlling intermittent operation of the motor M-2 so that through the linkage above described and appropriate gear reduction, the loading and unloading pushers 42 and 46 complete a round trip (a pushing and retracting stroke) in a minor portion of the time required for elevation of a rack through one rack shelf space, while during the remainder of such time the infeed conveyor operates to introduce a new row of hot bread loaves into position to be pushed onto a rack shelf and the discharge conveyor 34 operates to discharge a row of cooled bread loaves that have been pushed from a rack shelf.

The infeed and discharge conveyors 32 and 34 are mounted in the loading and unloading station 22 forward of and in spaced relation with respect to the path of a rack being elevated, as previously described. The discharge conveyor 34, FIGS. 2 and 4, includes a transversely extending endless belt 226 trained at one end over a driving roller 228 fixed on a shaft 230 journaled at its ends in a pair of vertical longitudinally spaced transversely extending mounting plates 232 secured in suitable manner to outer and inner frame members F and F' at the right or infeed and discharge side of the cooler. At its opposite end the belt 226 is trained over a driven roller 234 mounted on a shaft 236 journaled at its ends in a pair of mounting plates 238 similar to the mounting plates 232, secured in suitable manner to outer and inner frame members F and F' at the opposite side of the cooler. The drive means for the discharge conveyor 34 includes a chain 240 trained over a sprocket 242 fixed on an extension of shaft 230 and a sprocket 244 fixed on the output shaft 246 of motor M-3.

Disposed beneath the upper run of belt 226 is a transversely extending belt slide bed 248 provided along its forward and rearward edges with depending flanged portions 250 and 252 through which the slide bed 248 is rigidly secured to the mounting plates 232 and 238. The previously referred to transfer plate 48 is pivotally connected to the rearward edge of the slide bed 248, as at 254, FIG. 1, for limited vertical swinging movement to maintain the free edge of the transfer plate 48 in substantial registration with succeeding rack shelves during the pushing stroke of the unloading pusher 46.

The loading conveyor 36 of the infeed conveyor 32 includes a transversely extending endless belt 256 trained at one end over a driving roller 258 fixed on a shaft 260 journaled at its ends in the mounting plates 238 at the left side of the cooler opposite its infeed and discharge side. At its opposite end the belt 256 is trained over a driven roller 262 journaled at its ends in flanges 264 and 266 depending, respectively, from the forward and rearward edges of a transversely extending belt slide bed 268 disposed beneath the upper run of belt 256 between the mounting plates 232 and 238. The drive means for the loading conveyor includes a chain 270 trained over a sprocket 272 fixed on an extension of shaft 260 and a sprocket 274 fixed on the output shaft 276 of motor M-5.

The slide bed 268 is pivotally connected at its forward end, as at 278, to the upper end of brackets 280 rigidly secured to and extending upwardly from the forward flange 250 of the lower slide bed 248, for limited vertical swinging movement of the slide bed 268 and the previously referred to transfer plate 44 which is rigidly secured to the rearward edge of the slide bed 268, in order to maintain the free edge of the transfer plate 44 in substantial registration with succeeding rack shelves during the pushing stroke of the loading pusher 42.

The means for oscillating the transfer plate 48 and the slide bed 268 together with its transfer plate 44 in timed relation with the operation of the pushers 46 and 42 includes a pair of longitudinally extending operating rods 282 in opposite sides of the cooler housing 10, pivotally connected at their rearward ends to the upper ends of extensions 284 of the pusher operating arms 212. The forward ends of operating rods 282 are connected through bell crank assemblies 286 to the upper ends of operating arms 288. The lower ends of operating arms 288 are pivotally connected at 290 to the projecting ends of a transversely extending rod 292 secured in suitable manner to the underside of the transfer plate 44. Links 294 pivotally connect the under side of the transfer plate 44 with the free end of transfer plate 48, whereby the transfer plate 48 and the transfer plate 44 together with the slide bed 268 are oscillated in unison during operation of the pushers 46 and 42.

The timing conveyor 38 includes a transversely extending endless belt 296 trained at one end over a driving roller 298 fixed on a shaft 300 journaled at its ends in the upper laterally inner ends of mounting plates 232. At its opposite end, the belt 296 is trained over a driven roller 302 journaled at its ends in the upper laterally outer ends of mounting plates 232. The drive means for the timing conveyor 38 includes a chain 304 trained over a sprocket 306 fixed on an extension of shaft 300 and a sprocket 308 fixed on the output shaft 310 of motor M-6.

The size of the cooler is established by the baker's maximum production rate and the maximum desired cooling time for the product. Let it be assumed that the cooler has been sized in respect of the number of racks and shelves to handle the maximum production rate at a maximum cooling time of 70 minutes, with the shelves being 14 feet in width. For purpose of illustration let it be assumed that to load and unload each shelf with a 14 foot row of product requires presentation of a pair of shelves for simultaneous loading and unloading every 19.2 seconds, the "Varidyne" is therefore set to operate elevator motor M-1 for elevation of a rack through a shelf space distance in 19.2 seconds.

Referring particularly to FIGS. 1 and 11, a plurality of cam discs 312, 314, 316 and 318 are rigidly fixed on cam shaft 320 rotatably mounted in suitable manner in the upper forward end of the cooler housing 10. The cam shaft 320 is operated in timed relation with the rack elevator 24 through a sprocket chain 322 trained around a sprocket 324 on an elevator stub shaft 74 and a sprocket 326 mounted on cam shaft 320, to rotate the cam discs 312, 314, 316 and 318 through one revolution for each elevation of a rack by the rack elevator through one shelf space.

Cam discs 312, 314, 316 and 318 are shown in their relative positions in FIG. 11 at the time one rack shelf, in the present instance the bottom shelf of rack 14a, is in substantial registration with the free edge of downwardly sloping transfer plate 44 ready to be loaded; and the next rack shelf, in the present instance the top shelf of rack 14n, is in substantial registration with the free edge of downwardly sloping pivoted transfer plate 48 ready to be unloaded. Immediately upon further upward movement of the rack elevator from the position shown in FIG. 1, cam switch CS-1 engages notch 328 of cam disc 312 and, referring to FIG. 8, closes a circuit to and energizes control relay CR2. Energization of control relay CR2 closes its contacts CR2a, FIG. 6, completing the circuit to and energizing pusher motor M-2 to simultaneously start loading pusher 42 and unloading pusher 46 on their pushing strokes. Immediately after the pushers start, a normally closed limit switch LS-1, which is held open by the loading pusher 42 in its retracted or home position, closes to complete a holding circuit to and retain control relay CR2 energized when cam switch CS-1 rides out of notch 328 causing it to reopen. The speed reduction from pusher motor M-2 is such that the pushers 42 and 46 complete a pushing and retracting stroke during a minor portion of a revolution of the cam 312 so that, as previously described, the pushers operate during only a minor portion of the elevation of a rack through one shelf space, in the present example 2.2 seconds. Return of the loading pusher 42 to its retracted or home position opens limit switch LS-1 to break the circuit to and deenergize control relay CR2, thereby reopening contacts CR2a to break the circuit to and stop pusher motor M-2.

With the pushers 42 and 46 about to start on their pushing strokes as described above, and referring particularly to FIGS. 5, 8 and 11, cam switch CS-2 has just engaged the low portion of cam disc 314 to open cam switch CS-2 and break the circuit to and deenergize control relay CR5, thereby opening contacts CR5a to break the circuit to loading conveyor motor M-5 and stop the loading conveyor 36. The arcuate extent of the low portion of cam disc 314 is such that cam switch CS-2 will ride up onto the high portion of cam disc 314 to close cam switch CS-2, thereby energizing control relay CR5, closing contacts CR5a to complete the circuit to loading conveyor motor M-5 and initiate operation of loading conveyor 36, when the loading pusher 42 has returned to its home position to open limit switch LS-1 and interrupted operation of the pusher motor M-2. The loading conveyor consequently operates for the remainder of the shelf cycle time of 19.2 seconds or 17 seconds to introduce another row of bread loaves. The speed reduction from loading conveyor motor M-5 is such that in the above example, the loading conveyor travels a linear distance slightly more than 14 feet in the said 17 seconds to advance the leading loaf of a row of bread loaves from the infeed end of the loading conveyor 36 to a position in front of the far or left end of a rack shelf to present a full shelf row of loaves for transfer to a rack shelf on the next operation of the loading pusher.

Also, with the pushers 42 and 46 about to start on their pushing stroke as above described, and referring again to FIGS. 5, 8 and 11, cam switch CS-3 has just engaged the low portion of cam disc 316 to open cam switch CS-3 and break the circuit to and deenergize control relay CR3, thereby opening contacts CR3a to break the circuit to discharge conveyor motor M-3 and stop the discharge conveyor 34. Since the unloading pusher 46 does not traverse the discharge conveyor 34, the latter, unlike the loading conveyor 36, can be and is preferably restarted upon the completion of the pushing stroke of the unloading pusher 46 and does not have to wait until it has returned to its home position. To accomplish this, the low portion of cam disc 316 extends through half the distance of the low portion of cam disc 314, so that when cam switch CS-3 engages the high portion of cam disc 316 to close the same and energize control relay CR3, thereby closing contacts CR3a to complete the circuit to discharge conveyor motor M-3, the discharge conveyor 34 will start substantially before loading conveyor 36, or 1.1 seconds in the above example.

With this additional run time of the discharge conveyor 34 it will be seen that a full shelf row of bread loaves can be discharged entirely clear of the cooler onto the takeaway conveyor 330 while operating the discharge conveyor 34 at about or little greater speed than the loading conveyor 36. This is important in that it minimizes the possibility of disorienting or overturning of the bread loaves due to their inertia when the discharge conveyor starts on its loaf discharging travel.

Operation of the timing conveyor 38 starts simultaneously with operation of the loading conveyor 36 to deliver bread loaves from the timing conveyor 38 to the loading conveyor 36. For this purpose, referring again to FIGS. 5, 8 and 11, timing conveyor cam disc 318 is disposed on cam shaft 320 so that cam switch CS-4 engages the high portion of cam disc 318 at the same time that cam switch CS-2 engages the high portion of loading conveyor cam disc 314. Engagement of cam switch CS-4 with the high portion of cam disc 318 closes cam switch CS-4, thereby completing the circuit to and energizing control relay CR6. Energization of control relay CR6 closes the contacts CR6a to complete the circuit to timing conveyor motor M-6 and initiate operation of the timing conveyor 38.

However, it is important to stop the timing conveyor 38 sufficiently in advance of the loading conveyor 36 so that the last loaf of a group of bread loaves released by the timing conveyor 38 will be conveyed by the loading conveyor to a position wholly in front of the near end of a rack shelf when the loading conveyor stops, to thereby prevent a loaf from being jambed between the end of the loading pusher and the inner framework of the cooler housing or the side of a rack on the pushing stroke of the loading pusher. Thus, while the loading conveyor 36 travels a linear distance slightly greater than 14 feet, as previously pointed out, it will in such travel advance only enough loaves to fill the 14 foot shelf.

This is accomplished by making the arcuate extent of the high portion of cam disc 318 somewhat smaller than the high portion of cam disc 314, so that cam switch CS-4 drops off the high portion of cam disc 318 before the cam switch CS-2 drops off the high portion of cam disc 314, whereby the circuit to timing conveyor motor M-6 is broken before the circuit to loading conveyor motor M-5 is broken.

The loading conveyor 36 is preferably operated at a slightly faster speed than the timing conveyor to pull a gap between successive bread loaves whereby more effective and uniform cooling of the bread loaves is effected.

Should the ambient temperature or the nature of the product or other conditions be such as to make it desirable or necessary to subject the product to a shorter cooling time, for example a 50 minute cooling time, the operator depresses the decrease button 64 whereby, as previously described, the motor 58 operates to change the sheave ratio of the variable-sheave speed changing transmission 54 of the "Varidyne" system, thereby increasing the speed of the alternator 56 to increase the frequency of the current and increase the speeds of the rack elevating and lowering motor M-1, the rack advance and discharge motor M-4 and the pusher motor M-2 at the same time and by the same proportional amounts. The speeds of these motors control the retention time of the product in the cooler, and when the speeds have increased sufficiently to provide a 50 minute retention time, observable by the operator when the voltage controlled indicator reaches the indicia 50 on the calibrated scale 68, as previously described, the operator releases the decrease button 64.

The shelf cycle time or the time required for elevation of a rack through one shelf space, in the present example, decreases from the 19.2 seconds at the previously described 70 minute cooling time to 13.7 seconds while the pushers complete a pushing and retracting stroke in 1.57 seconds. The speeds of the loading conveyor motor M-5, the timing conveyor motor M-6 and the discharge conveyor motor M-3, however, remain constant. To accommodate the baker's maximum production rate at a cooling time or product retention time of 50 minutes, now requires filling each 14 foot rack shelf only 50/70 or 10 feet of each shelf instead of its full length of 14 feet. Since the cam discs 314, 316 and 318, as previously brought out, are mounted on shaft 320 which is operated in timed relation with the elevator 24 to make one revolution for each travel of a rack through one rack shelf space, the run times of the loading conveyor, timing conveyor and discharge conveyor are proportionately decreased. Thus the loading conveyor 36 runs only a sufficient distance to bring into position to be loaded a 10 foot row of product, while the discharge conveyor which, as previously stated, enters the cooler from the same side as the loading and timing conveyors runs a sufficient time to discharge the product from in front of the shelf that has been unloaded.

It will be seen from the above description that the invention provides means for automatically controlling the distance that the infeed and discharge conveyors will run in proportion to the desired cooling time, whereby the baker's maximum production rate can be accommodated without increasing the speed of the infeed and discharge conveyors when the retention time of the product in the cooler is reduced from maximum of 70 minutes to 65, 60, 55 or 50 minutes or any intermediate cooling times. The partial loading of the cooler shelves as previously described is particularly advantageous on large capacity coolers which when run on short cooling times have a fast shelf to shelf cycle time as low in some cases as 10 seconds.

While the invention has been described with particular reference to the cooling of bread loaves, it should be understood that it is equally applicable to other articles that are delivered to and discharged from an article treating zone.

I claim:

1. An article treating apparatus including a housing enclosing an article treating zone;
   a plurality of article supporting shelves;
   means for conducting said shelves in a closed loop through said article treating zone past an article loading station and an article unloading station;
   drive means for operating said shelf conducting means including a motor and means associated with said motor for selectively changing the speed of said conducting means for correspondingly changing the residence time of said articles in said treating zone in their travel from said loading station to said unloading station;
   an endless article infeed conveyor in said loading station in confronting relation with respect to the path of movement of said shelves through said loading station;
   an endless article discharge conveyor in said unloading station in confronting relation with respect to the path of movement of said shelves through said unloading station;
   drive means including motor means for operating said infeed and discharge conveyors at a constant speed and in a direction for feeding untreated articles into said loading station and discharging treated articles from said unloading station from the same side of said housing; and
   control means operated in timed relation with said shelf conducting means for effecting intermittent operation of said infeed and discharge conveyor motor means as each of said shelves passes through said loading and unloading stations to automatically vary the run time of said infeed and discharge conveyors and the linear travel thereof proportionally to the residence time of said articles in said treating zone to introduce into and discharge from said loading and unloading stations proportionally varying lengths of rows of articles.

2. An article treating apparatus including a housing enclosing an article treating zone;
   a plurality of article supporting shelves;
   means for sequentially conducting said shelves in a closed loop through said article treating zone in equidistantly spaced relation past an article loading station and an article unloading station;
   drive means for operating said shelf conducting means including a motor and means associated with said motor for selectively changing the speed of said conducting means for changing the residence time of said articles in said treating zone in their travel from said loading station to said unloading station between a desired maximum and minimum;
   an endless infeed conveyor in said loading station in confronting relation with respect to the path of said shelves through said loading station and extending at least the width of said shelves;
   an endless discharge conveyor in said unloading station in confronting relation with respect to the path of said shelves through said unloading station and extending at least the width of said shelves;
   drive means including motor means for operating said infeed and discharge conveyors at a constant speed and in a direction for feeding untreated articles into said loading station and discharging treated articles from said unloading station from the same side of said housing; and
   control means operated in timed relation with said shelf conducting means for intermittently operating said infeed and discharge conveyors during a portion of the movement of a shelf by said shelf conducting means through a shelf space to automatically vary the run time of said infeed and discharge conveyors and the linear travel thereof proportionally to the residence time of said articles in said treating zone to introduce into and discharge from said loading and unloading stations proportionally varying lengths of rows of articles;
   said last named drive means being arranged to operate said infeed and discharge conveyors at a speed to introduce into and discharge from said loading and unloading stations a full shelf row of articles at said maximum residence time of said articles in said treating zone.

3. An apparatus in accordance with claim 2 including means operated in timed relation with said shelf conducting means during the lull in the intermittent operation of said infeed and discharge conveyors for loading a row of articles from said infeed conveyor onto each of said shelves and unloading a row of articles from each of said shelves onto said discharge conveyor.

4. An article treating apparatus including a housing enclosing an article treating zone;

a plurality of article supporting shelves;

means for conducting said shelves in a closed loop through said article treating zone past a loading station and an unloading station;

drive means including a motor for operating said shelf conducting means, a variable frequency power source for said motor including means for selectively varying the frequency to said motor to operate said shelf conducting means at different selected speeds for selectively changing the residence time of said articles in said treating zone in their travel from said loading station to said unloading station;

an endless article infeed conveyor in said loading station in confronting relation with respect to the path of movement of said shelves through said loading station;

an endless article discharge conveyor in said unloading station in confronting relation with respect to the path of movement of said shelves through said unloading station;

a constant frequency power source;

drive means including motive means connected with said constant frequency power source for operating said infeed and discharge conveyors at a constant speed and in a direction for feeding untreated articles into said loading station and discharging treated articles from said unloading station from the same side of said housing; and control means operated in timed relation with said shelf conducting means for effecting intermittent operation of said infeed and discharge conveyor motive means as each of said shelves passes through said loading and unloading stations to automatically vary the run time of said infeed and discharge conveyors and the linear travel thereof proportionally to the residence time of said articles in said treating zone to introduce into and discharge from said loading and unloading stations proportionally varying lengths of rows of articles.

5. An apparatus in accordance with claim 4 including means operated from said variable frequency power source during the lull in the intermittent operation of said infeed and discharge conveyors for loading a row of articles from said infeed conveyor onto each of said shelves and unloading a row of articles from each of said shelves onto said discharge conveyor.

6. An apparatus in accordance with claim 4 including shelf loading means at said loading station and shelf unloading means at said unloading station;

motor means connected with said source of variable frequency power for operating said shelf loading and unloading means; and control means for said last named motor means operated in timed relation with said shelf conducting means for operating said shelf loading and unloading means during the lull in the intermittent operation of said infeed and discharge conveyors in timed relation with the arrival of said shelves at said loading and unloading stations.

7. An article treating apparatus including a housing enclosing an article treating zone;

a plurality of article supporting shelves;

means for sequentially conducting said shelves in a closed loop through said article treating zone in equidistantly spaced relation past an article loading station and an article unloading station;

an article infeed and an article discharge conveyor adjacent the path of said shelves through said article loading and unloading stations operated respectively in a direction for feeding successive rows of untreated articles in front of said shelves and for discharging successive rows of treated articles from in front of said shelves from the same side of said housing;

an intermittently operated loading pusher for pushing successive rows of articles from said infeed conveyor onto successive shelves;

an intermittently operated unloading pusher for pushing successive rows of articles from successive shelves onto said discharge conveyor;

a first motor for operating said shelf conducting means;

a second motor for operating said pushers;

a variable frequency power source connected with said motors for selectively changing the speed of operation of said shelf conducting means and said pushers concurrently and by the same proportional amount to selectively change the residence time of said articles in said treating zone;

a third motor for operating said infeed conveyor;

a fourth motor for operating said discharge conveyor;

said third and fourth motors being connected with a constant frequency power source; and control means operated in timed relation with said shelf conducting means for intermittently operating said third and fourth motors to proportionately vary the run time of said infeed and discharge conveyors and the linear travel thereof to correspondingly vary the retention time of said articles in said treating zone and introduce into and discharge from said treating zone proportionately longer or shorter rows of articles.